(12) United States Patent
Tuccinardi et al.

(10) Patent No.: US 7,407,227 B1
(45) Date of Patent: *Aug. 5, 2008

(54) HEADREST HAVING AN INTEGRATED VIDEO SCREEN

(75) Inventors: Eugene M. Tuccinardi, Temecula, CA (US); Ernesto R. Haack, Perris, CA (US); Robert Murphy, Lake Elsinore, CA (US); Frank Barrese, Temecula, CA (US); Roel C. Espina, Loma Linda, CA (US); Jon A. Molo, Ontario (CA); Theo Zoetemelk, Riverside, CA (US)

(73) Assignee: Timely Innovations, L.P., Temecula, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/415,696

(22) Filed: May 2, 2006

Related U.S. Application Data

(63) Continuation of application No. 10/395,870, filed on Mar. 20, 2003, now Pat. No. 7,040,697.

(51) Int. Cl.
*A47C 7/62* (2006.01)
(52) U.S. Cl. .............................. 297/217.3; 297/188.04
(58) Field of Classification Search ............. 297/217.3, 297/188.04, 188.07, 408, 391; 5/643, 645
See application file for complete search history.

(56) References Cited

U.S. PATENT DOCUMENTS 3,004,815 A   10/1961  O'Kain et al.
4,584,603 A   4/1986   Harrison
4,635,110 A   1/1987   Weinblatt
4,647,980 A   3/1987   Steventon et al.

(Continued)

FOREIGN PATENT DOCUMENTS

DE      3637772 A1    5/1988

(Continued)

OTHER PUBLICATIONS

WO 02/074577. Jost, Gilbert. Headrest, Particularly for a Motor Vehicle Seat, Sep. 26, 2002.*

(Continued)

*Primary Examiner*—Sarah B McPartlin
(74) *Attorney, Agent, or Firm*—Knobbe, Martens, Olson & Bear, LLP

(57) ABSTRACT

A seat back video display assembly adapted to be positioned in the back of a vehicle seat having an outer skin cover. In one aspect, the assembly may comprise a receptacle member having sidewalls and a back wall so as to define an opening wherein the receptacle member is adapted to be positioned in the back of the vehicle seat. In addition, the assembly may further comprise a carrier member having sidewalls and a back wall so as to define an opening, wherein the carrier member includes at least one fastener that extends from the back wall of the carrier member and engages with the back wall of the receptacle member to secure the carrier member into the receptacle member. Moreover, the assembly may still further comprise a video display unit that is sized so as to be positioned secured within the opening in the carrier member, wherein the video display unit provides video signals.

14 Claims, 10 Drawing Sheets

U.S. PATENT DOCUMENTS

| | | | |
|---|---|---|---|
| 4,681,366 A * | 7/1987 | Lobanoff | 297/188.06 |
| 4,756,528 A | 7/1988 | Umashankar | |
| 4,776,739 A * | 10/1988 | Hamman | 411/510 |
| 4,788,588 A | 11/1988 | Tomita | |
| 4,866,515 A | 9/1989 | Tagawa et al. | |
| RE33,423 E | 11/1990 | Lobanoff | |
| 4,983,951 A | 1/1991 | Igarashi et al. | |
| 5,267,775 A * | 12/1993 | Nguyen | 297/217.3 |
| 5,292,174 A | 3/1994 | Ohnuma | |
| 5,293,244 A | 3/1994 | Kawaguchi | |
| 5,311,302 A | 5/1994 | Berry et al. | |
| 5,333,416 A | 8/1994 | Harris et al. | |
| 5,359,349 A | 10/1994 | Jambor et al. | |
| 5,507,556 A * | 4/1996 | Dixon | 297/217.3 |
| 5,529,265 A | 6/1996 | Sakurai | |
| 5,555,466 A | 9/1996 | Scribner et al. | |
| 5,640,297 A | 6/1997 | Labaze | |
| 5,713,633 A | 2/1998 | Lu | |
| D398,921 S | 9/1998 | Rosen | |
| 5,842,715 A | 12/1998 | Jones | |
| 5,953,784 A * | 9/1999 | Suzuki et al. | 15/209.1 |
| 6,024,027 A | 2/2000 | Esmaili | |
| 6,055,478 A | 4/2000 | Heron | |
| D434,400 S | 11/2000 | Rosen | |
| 6,199,948 B1 | 3/2001 | Bush et al. | |
| 6,216,927 B1 | 4/2001 | Meritt | |
| 6,250,967 B1 | 6/2001 | Chu | |
| 6,292,236 B1 | 9/2001 | Rosen | |
| 6,305,046 B1 * | 10/2001 | Kingry et al. | 15/231 |
| 6,339,455 B1 | 1/2002 | Allan et al. | |
| 6,394,551 B1 | 5/2002 | Beukema | |
| 6,406,334 B2 | 6/2002 | Chu | |
| 6,409,242 B1 | 6/2002 | Chang | |
| 6,480,243 B2 | 11/2002 | Yamamoto | |
| 6,669,285 B1 * | 12/2003 | Park et al. | 297/217.3 |
| 6,739,654 B1 | 5/2004 | Shen et al. | |
| 6,750,599 B2 | 6/2004 | Tajima | |
| 6,755,491 B2 | 6/2004 | McElheney | |
| 6,762,929 B2 | 7/2004 | Sawyer | |
| 6,883,870 B2 * | 4/2005 | Jost | 297/391 |
| 7,036,879 B2 | 5/2006 | Chang | |
| 7,038,581 B2 | 5/2006 | Kendall et al. | |
| 7,040,697 B1 * | 5/2006 | Tuccinardi et al. | 297/217.3 |
| 7,044,546 B2 | 5/2006 | Chang | |
| 2001/0008266 A1 | 7/2001 | Lambert | |
| 2003/0025367 A1 * | 2/2003 | Boudinot | 297/217.3 |
| 2004/0007906 A1 | 1/2004 | Park et al. | |
| 2004/0032543 A1 * | 2/2004 | Chang | 348/837 |
| 2004/0160096 A1 | 8/2004 | Boudinot | |
| 2005/0099042 A1 | 5/2005 | Vitito | |
| 2005/0242638 A1 | 11/2005 | Vitito | |
| 2007/0001492 A1 | 1/2007 | Chang | |
| 2007/0102973 A1 | 5/2007 | Vitito | |

FOREIGN PATENT DOCUMENTS

| | | |
|---|---|---|
| DE | 19601582 A1 | 1/1996 |
| FR | 2764563 A1 | 12/1998 |
| JP | 01094048 A2 | 4/1989 |

OTHER PUBLICATIONS

Office Action of Jul. 27, 2007 for U.S. Appl. No. 10/819,341.
Response to Office Action of Jul. 27, 2007 for U.S. Appl. No. 10/819,341.
Office Action of Jan. 31, 2007 for U.S. Appl. No. 11/415,918.
Response to Restriction Requirement of May 10, 2007 for U.S. Appl. No. 10/819,341.
Restriction Requirement of May 10, 2007 for U.S. Appl. No. 10/819,341.
Response to Office Action of Jan. 31, 2007 for U.S. Appl. No. 11/415,918.
Final Office Action of Jul. 30, 2007 for U.S. Appl. No. 11/415,918.
RCE and Response to Final Office Action of Jul. 30, 2007 for U.S. Appl. No. 11/415,918.
Restriction Requirement of Jul. 19, 2004 for U.S. Appl. No. 10/395,870.
Response to Restriction Requirement of Jul. 19, 2004 for U.S. Appl. No. 10/395,870.
Office Action of Sep. 27, 2004 for U.S. Appl. No. 10/395,870.
Response to Office Action of Sep. 27, 2004 for U.S. Appl. No. 10/395,870.
Final Office Action of May 3, 2005 for U.S. Appl. No. 10/395,870.
RCE & Response to Final Action of May 3, 2005 for U.S. Appl. No. 10/395,870.
Notice of Allowance of Dec. 6, 2005 for U.S. Appl. No. 10/395,870.

* cited by examiner

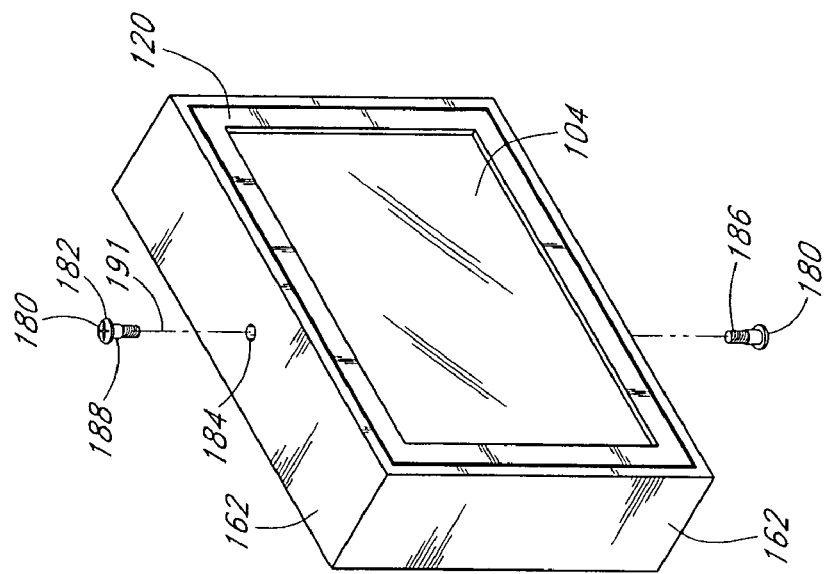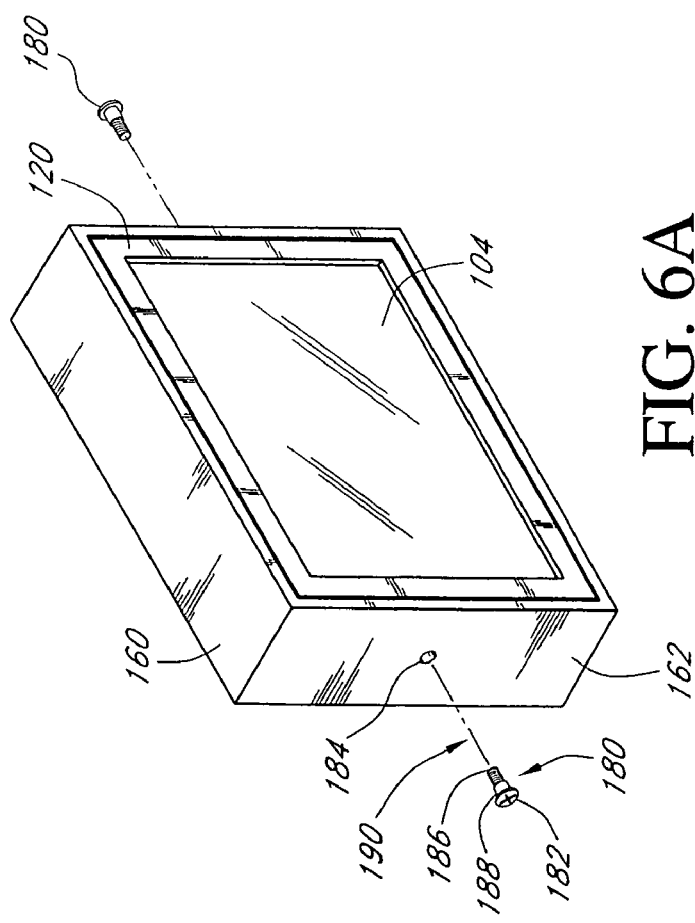

HEADREST HAVING AN INTEGRATED VIDEO SCREEN

RELATED APPLICATIONS

This application is a continuation of U.S. application Ser. No. 10/395,870 filed Mar. 20, 2003 now U.S. Pat. No. 7,040, 697, entitled "HEADREST HAVING AN INTEGRATED VIDEO SCREEN," which is hereby incorporated by reference herein in its entirety; and this application is related to U.S. application Ser. No. 10/819,341 filed Apr. 5, 2004, entitled "HEADREST/HEAD RESTRAINT HAVING AN INTEGRATED VIDEO SCREEN," and to U.S. application Ser. No. 11/415,918 filed concurrently with this application, entitled "HEADREST HAVING AN INTEGRATED VIDEO SCREEN," which is a divisional of the above-identified Ser. No. 10/395,870 application.

BACKGROUND OF THE INVENTION

1. Field of the Invention

The present invention relates to motor vehicles and, in particular, to a headrest for motor vehicle seats having an integrated video screen mounted therein.

2. Description of the Related Art

Seat back video monitors are becoming increasingly popular in vehicles. Originally, these entertainment systems were largely confined to airplanes, however, recently, these systems have become much more popular with cars, trucks and SUVs. These entertainment systems provide the opportunity for passengers to view entertainment or educational video programs during long trips.

Typically, these systems have been installed as aftermarket products where the seat back is modified to accept the video display device, however, more of these systems are being installed as original equipment. Unfortunately, existing systems are often difficult and labor intensive to mount, particularly as an aftermarket product and are also subject to being dislodged.

Generally, the devices are mounted on the outer surface of the seat back where they protrude. In many vehicles, the space between seats and seat backs is limited, hence the protruding video display unit can inhibit the ability of passengers to easily get into and out of the vehicles. Moreover, passenger contact with the protruding video display screen may result in the screens being inadvertently dislodged.

A further difficulty with many existing video display unit designs is that they are not well secured to the seat. This is particularly the case for designs that allow the video display unit to pivot about an axis to improve the viewing angle of the passenger. One common way that these display units are installed is that a bucket is installed into the seat and the peripheral rim of the bucket includes openings that receive pivot posts that extend outward from the housing of the display unit. The pivot posts are positioned within the openings and keepers or caps are then positioned in the openings to prevent the pivot posts from being removed from the openings.

In these designs, the keepers or caps are generally press fit and are exposed to the passenger. Hence, inadvertent contact may result in the keepers or caps being dislodged. Moreover, many of the passengers are children who, through boredom, may attempt to remove the keepers which can result in the video display being dislodged and potentially damaged.

Hence, from the foregoing, there is a need for a seat back video display system and method of mounting that provides more secure mounting of the video display unit. To this end, there is a need for an assembly that is less likely to be dislodged through inadvertent contact and does not have exposed detachable mounting components.

SUMMARY OF THE INVENTION

The aforementioned needs may be satisfied by a seat back video display assembly adapted to be positioned in the back of a vehicle seat having an outer skin cover. In one aspect, the assembly may comprise a receptacle member having sidewalls and a back wall so as to define an opening, wherein the receptacle member is adapted to be positioned in the back of the vehicle seat. In addition the assembly may further comprise a carrier member having sidewalls and a back wall so as to define an opening, wherein the carrier member includes at least one fastener that extends from the back wall of the carrier member and engages with the back wall of the receptacle member to secure the carrier member into the receptacle member, and a video display unit that is sized so as to be positioned secured within the opening in the carrier member, wherein the video display unit provides video signals.

Additionally, in one embodiment, the at least one fastener may comprise a plurality of fasteners that include a central member that extends outward from back wall of the carrier member and a plurality of flexible engagement members attached to the central member, wherein the flexible engagement members are deformable so as to allow insertion of the central member into the openings in the back wall of the receptacle member, and wherein the flexible engagement members are biased outward so as to inhibit removal of the central member from the openings in the back wall of the receptacle member. Also, the video display unit may be pivotally attached to the carrier member such that the plane of the video display unit can be adjusted by a user about a pivot point or axis, wherein the video display unit may be pivotable about a substantially horizontal pivot axis, a substantially vertical pivot axis, or pivot point that allows a continuous range of pivotal motion about the pivot point. Also, the openings may be positioned in the sidewalls of the receptacle member and the plurality of capture members are positioned within the openings, and wherein the plurality of capture members define a pointed surface that engages with the outer skin and inhibits removal of the outer skin from the opening defined by the receptacle member so as to securely fasten the outer skin to the receptacle member.

Additionally, in certain embodiments, the seat back video display assembly includes a screen cover that is dimensioned to cover the video display unit such that the screen cover can disengageably cover the screen of the video display unit to occlude the screen. The screen cover can include an impact attenuating material, a rigid protective layer, or any combination thereof.

The aforementioned needs may also be satisfied by a vehicle seat assembly having a seat back display. In one aspect, the vehicle seat assembly may comprise a vehicle seat adapted to receive an occupant during travel of a vehicle, the vehicle seat defining a seat back with an outer contour and a skin, and a receptacle member having sidewalls and a back wall to as to define an opening, wherein the receptacle member is mounted in the seat back of the vehicle seat such that the sidewalls are located at or below the outer contour of the seat back. In addition, the vehicle seat assembly may further comprise a video display unit mounted within the receptacle member, wherein the video display unit is generally planar with the outer plane being mounted at or below the outer contour of the seat back.

Moreover, the aforementioned needs may also be satisfied by a method of installing a video display unit into a seat back of a vehicle seat. In one embodiment, the method may comprise cutting an opening through an outer skin of the seat back, forming an aperture in the seat back, and positioning a receptacle in the aperture such that the receptacle is mounted at or below the level of the seat back. In addition, the method may comprise securing the video display unit to a carrier, and mounting the carrier into the receptacle such that an upper surface of the video display unit is mounted below the outer surface of the seat back. These and other objects and advantages of the present invention will become more fully apparent from the following description taken in conjunction with the accompanying drawings.

BRIEF DESCRIPTION OF THE DRAWINGS

FIGS. 6A, 6B illustrate a perspective view of mounting the integrated video screen to the carrier member.

DETAILED DESCRIPTION OF THE PREFERRED EMBODIMENT

Reference will now be made to the drawings wherein like numerals refer to like parts throughout. A headrest for motor vehicle seats having an integrated video screen mounted therein in a flush or recessed manner will be described in greater detail herein below with reference to the drawings. In one aspect, it should be appreciated that the term motor vehicle seats refers to a plurality of generally known motor vehicles seats, such as those manufactured for automobiles, buses, boats, cars, semi-trucks, etc., wherein the following discussion can be similarly applied to these various types of motor vehicle seats without departing from scope of the present teachings. In addition, the following discussion refers to mounting the integrated video screen to the headrest of motor vehicle seats but may also be applied to other various component features of motor vehicle seats, such as the seat back, without departing from the scope of the present teachings.

Figure 1A:
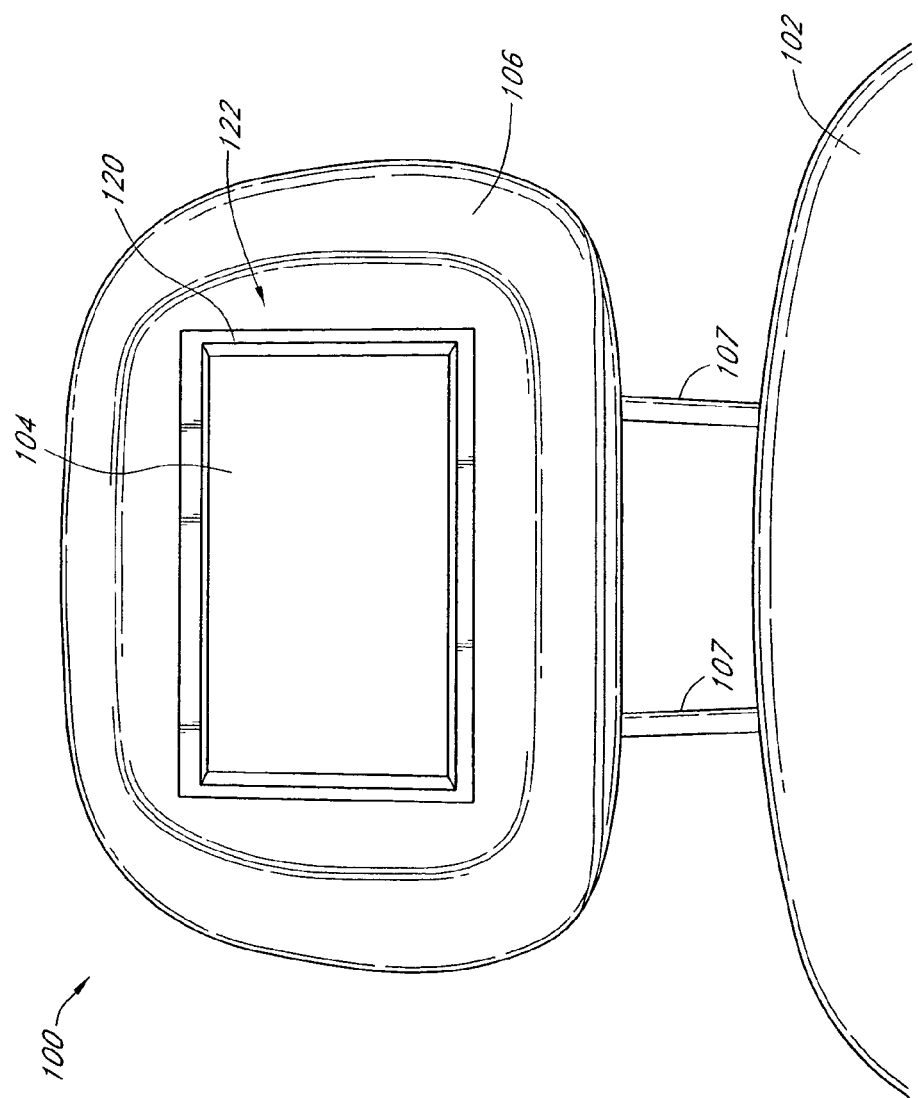
FIG. 1A illustrates an adjustable headrest for a motor vehicle seat having an integrated video screen mounted therein.
Figure 1B:
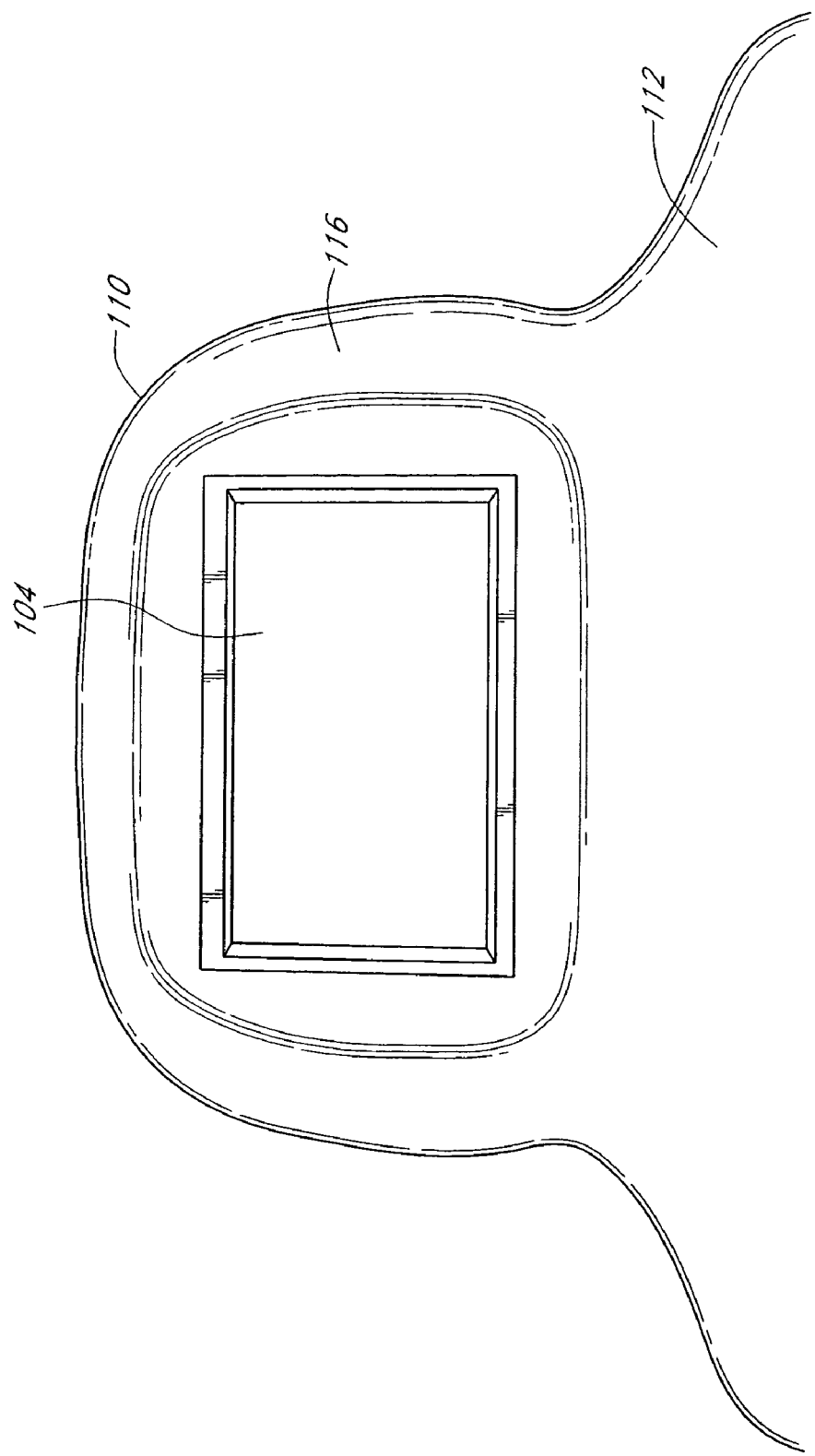
FIG. 1B illustrates a fixed headrest for a motor vehicle seat having the integrated video screen of FIG. 1A mounted therein.

FIG. 1A illustrates an adjustable headrest 100 for a first motor vehicle seat 102 having an integrated video screen 104 mounted therein. As illustrated in FIG. 1A, the adjustable headrest 100 is coupled to the seat 102 via posts 107 that extend therefrom and allow vertical adjustment of the adjustable headrest 100 with respect to the seat 102 in a generally known manner. FIG. 1B illustrates a fixed headrest 110 for a second motor vehicle seat 112 having the integrated video screen 104 mounted therein. In one embodiment, the video screen 104 is mounted within a headrest bun 106, 116 that is adapted to receive the video screen 104 for firm attachment therein in a manner that will be described in greater detail herein below. In addition, as will be described in greater detail herein below, the video screen 102 is mounted such that a front surface 120 of the video screen 104 is either flush or recessed from a contour 122 of the headrest 100, 110.

In one embodiment, the video screen 104 comprises a generally known LCD (liquid crystal display) monitor or terminal that can be electrically coupled to a video entertainment system so as to receive video signals therefrom for viewing of movies, television, internet web pages, video games, etc. As illustrated, the video screen 104 is generally rectangular in shape with the planar front surface 120 that is viewable by a user. In one aspect, it should be appreciated that the degree of recessed depth (with no depth comprising a flush mount) of the integrated video screen 104 and the manner in which the contour 122 of the seat 102, 112 is shaped may be selected such that the shape (side view, for example) of the headrest 100, 110 with the integrated video screen 104 mounted therein is generally similar to the shape of the headrest 100, 110 without the integrated video screen 104. Moreover, it should be appreciated that the motor vehicle seats 102, 112 may comprise any one of a number of various types or models of generally known motor vehicle seats without departing from the scope of the present invention.

Figure 2:
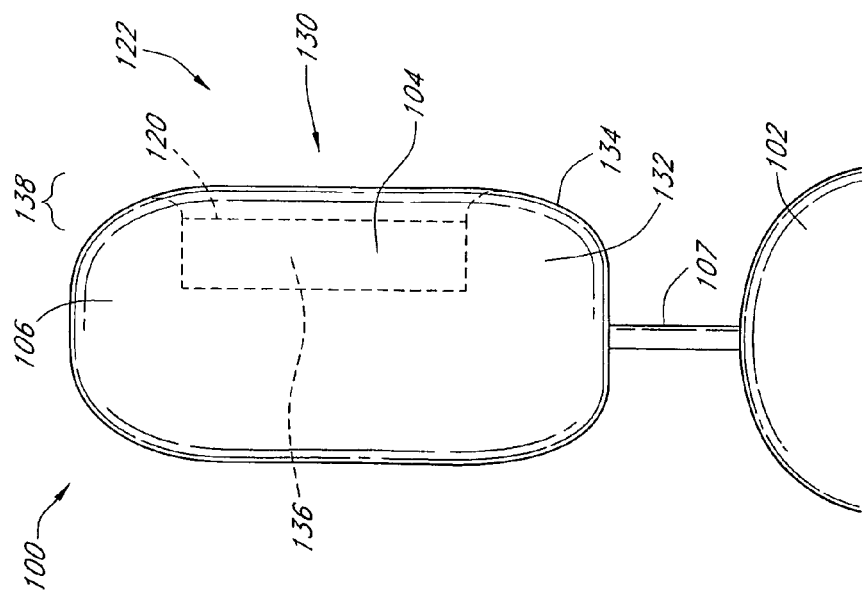
FIG. 2 illustrates a side view of the adjustable headrest shown in FIG. 1A having the integrated video screen mounted therein with a recessed orientation.

FIG. 2 illustrates a side view of the adjustable headrest 100 shown in FIG. 1A having the integrated video screen 104 mounted therein with a recessed orientation. It should be appreciated that the following discussion is with respect to the adjustable headrest 100 of FIG. 1A but may be similarly applied to the fixed headrest 110 of FIG. 1B without departing from the scope of the present teachings.

FIG. 2 further illustrates the side view shape or contour 122 of the headrest 100. As illustrated in FIG. 2, the contour 122 of the headrest 100 is maintained due to the recessed orientation of the video screen 104 within the headrest bun 106. In addition, an opening 130 is formed in a rear section 132 of the headrest 100 so as to define a substantially rectangular interior region 136 within the headrest bun 106 below an outer surface 134 of the headrest 100. As further illustrated in FIG. 2, the video screen 104 can then be positioned adjacent the opening 130 so as to be firmly positioned within the interior region 136 of the headrest bun 106. Moreover, the recessed orientation may be defined by a depth 138 between the front surface 120 of the video screen 104 and the outer surface 134 of the headrest 100. The depth 138 therebetween may vary in magnitude depending on the thickness of the headrest bun 106 and/or the internal structural characteristics of the headrest 100, which may vary with respect to the type or model of motor vehicle seat used. In one aspect, the depth 138 of the recessed orientation may comprise a magnitude of approximately zero so as to define a flush mounted video screen 104, wherein the front surface 1120 of the video screen 104 is substantially aligned with the outer surface 134 of the headrest 100.

Figure 3A:
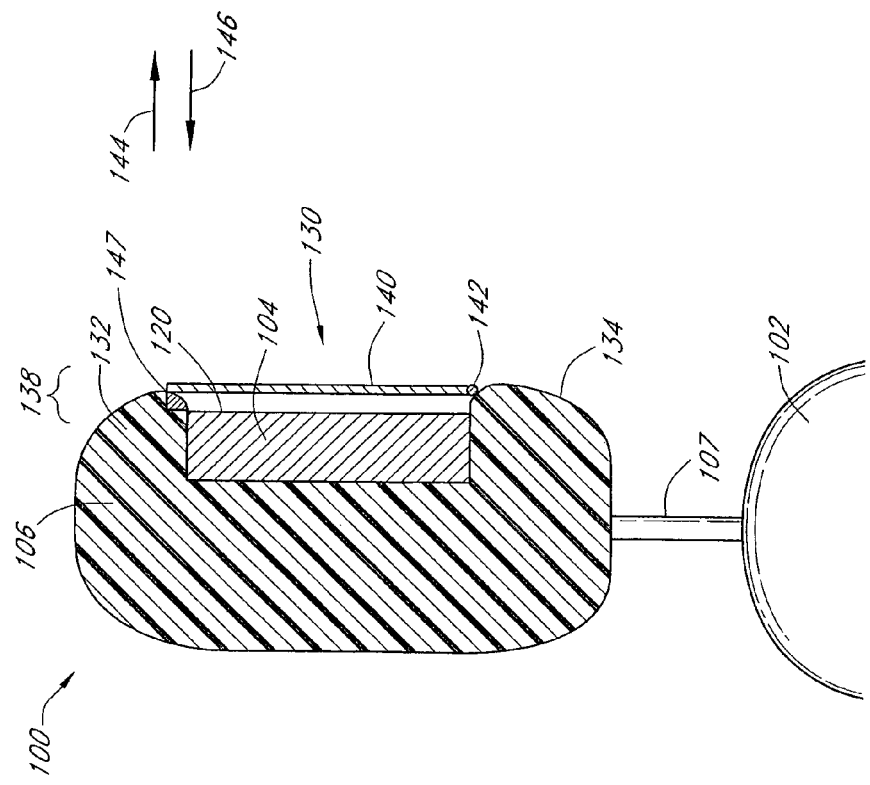
FIGS. 3A, 3B illustrate a cross-sectional view of the adjustable headrest shown in FIG. 1A having the integrated video screen mounted therein with a screen cover.

FIG. 3A illustrates a cross-sectional view of the adjustable headrest 102 shown in FIG. 1A having the integrated video screen 104 mounted therein with the recessed orientation shown in FIG. 2 and a screen cover 140. In one embodiment, the screen cover 140 is coupled to the rear section 132 of the headrest 100 via a hinge 142 so as to overlie the video screen 104 and at least part of the opening 130 formed therein. The screen cover 140 may comprise generally rectangular shape and is oriented generally parallel to the front surface 120 of the video screen 104 so as to temporarily occlude the video screen 104. In one aspect, as further illustrated in FIG. 3A, the screen cover 140 can be positioned adjacent the opening 130 so as to substantially align with the outer surface 134 of the headrest 100 thus forming a flush mounting therewith. It should be appreciated that the screen cover 140 may be positioned within the opening 130 so as to be recessed with respect to the outer surface 134 of the headrest 100 without departing from the scope of the present teachings. Moreover, the screen cover 140 may comprise a rigid material, such as plastic, metal, etc. Alternatively, in another aspect, the screen cover 140 may comprise a piece or flap of material from an outer skin 230 (FIG. 8) of the motor vehicle seat 102 that is attached to the headrest 100 adjacent the lower side of the video screen 104.

Figure 3B:
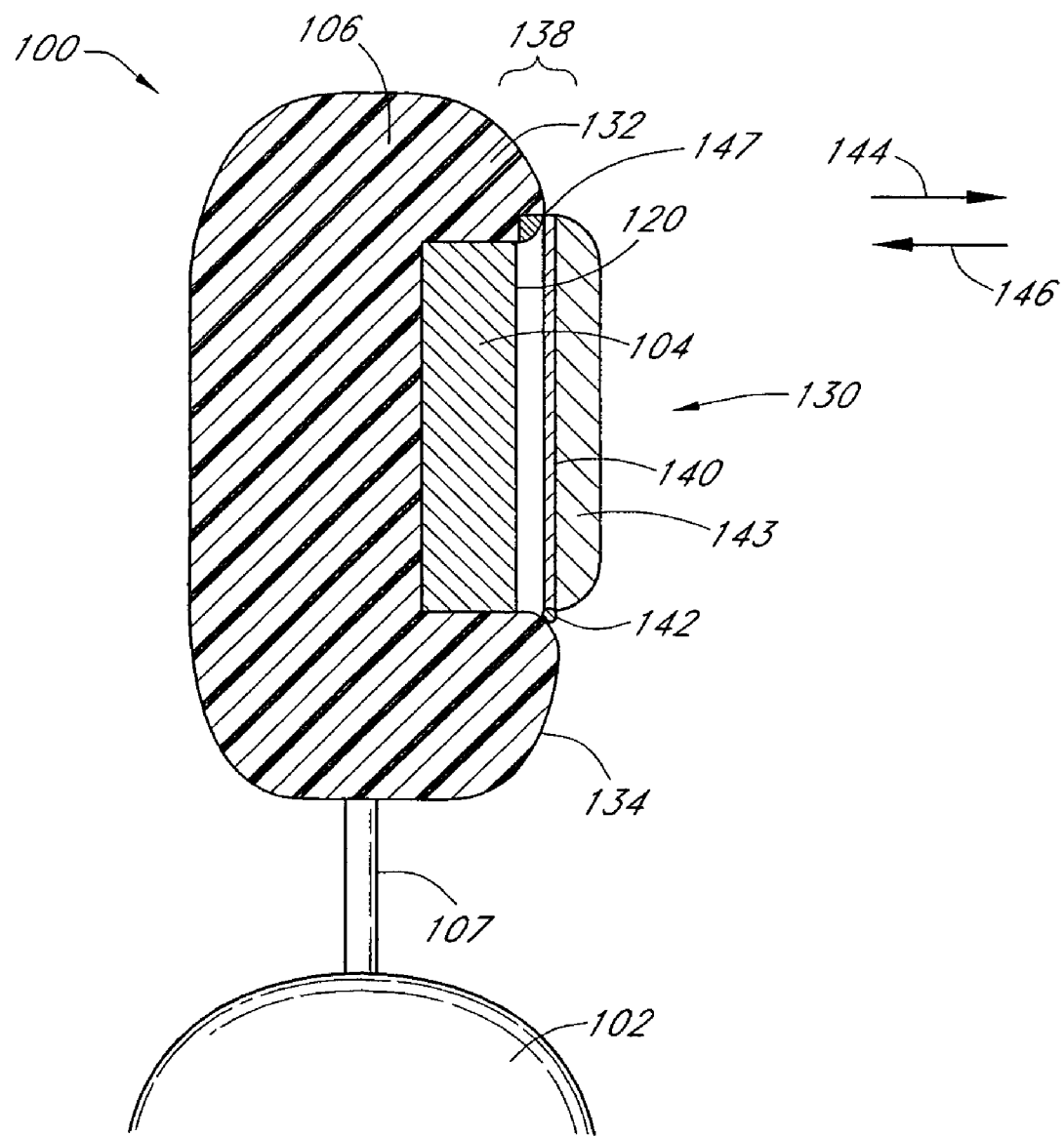

In still another aspect, as illustrated in FIG. 3B, the screen cover 140 may comprise an impact attenuating section 143 comprising a material such as foam, various types of padding, an air cushion, etc. so as to soften the force of an impact from an object. For example, during a car accident, a person's head may be propelled towards the screen cover 140, wherein the impact attenuating material may soften the impact to the headrest 102 to thereby protect the person's head and the video screen 104 from damage.

Also, in one embodiment, the video screen 104 can be viewed by opening the screen cover 140 or temporarily occluded by closing the screen cover 140. Hence, the screen cover 140 can be outwardly rotated about the hinge 142 in a first direction 144 to openly view the video screen 104, or the screen cover 140 can be inwardly rotated about the hinge 142 in a second direction 144 opposite the first direction 144 to temporarily occlude the video screen 104. Advantageously, the screen cover 104, when closed, conceals the video screen 104 from view thus, in some situations, functions as a thief deterrent.

Moreover, in one aspect, the recessed configuration of the video screen 104 facilitates the manner in which the screen cover 140 may be deployed. For example, the video screen 104 may not physically interfere with the closing of the screen cover 140. In addition, as illustrated in FIGS. 3A, 3B, the screen cover 140 is intended to "hide" the video screen 104 from outside observers, thereby reducing the probability that the video screen 104 will be a target of theft. As further illustrated in FIGS. 3A, 3B, the screen cover 140 may further comprise a means for engagement 147 that allows the screen cover 140 to remain in the "up" or closed configuration. In general, it should be appreciated that some possible means for achieving such an engagement include but are mot limited to magnetic strips, mechanical clips, velcro strips, and the like.

Figure 4:
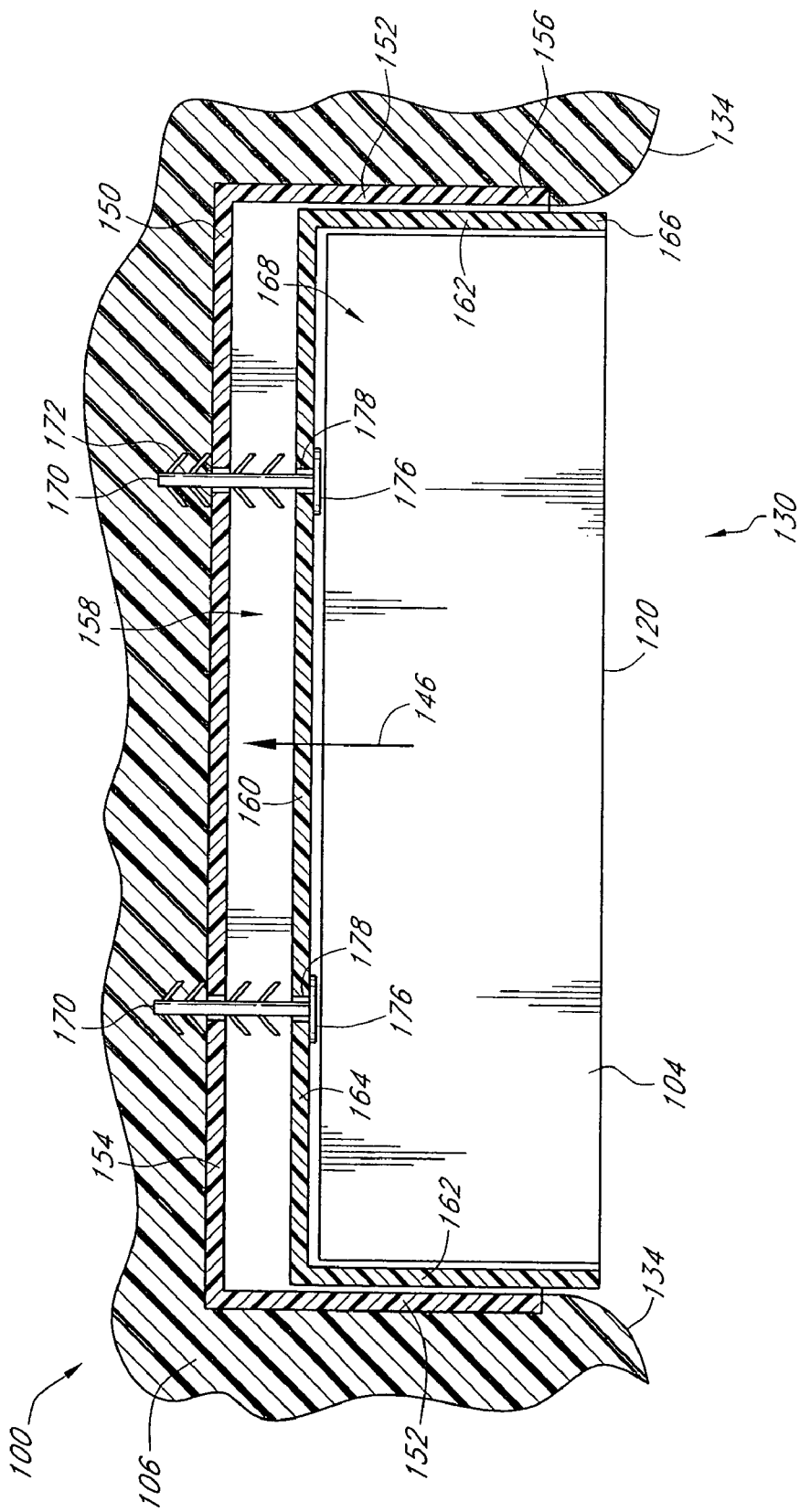
FIG. 4 illustrates a cross-sectional view of the integrated video screen being mounted to the headrest via a carrier receptacle, a carrier member, and a plurality of fasteners.
Figure 5:
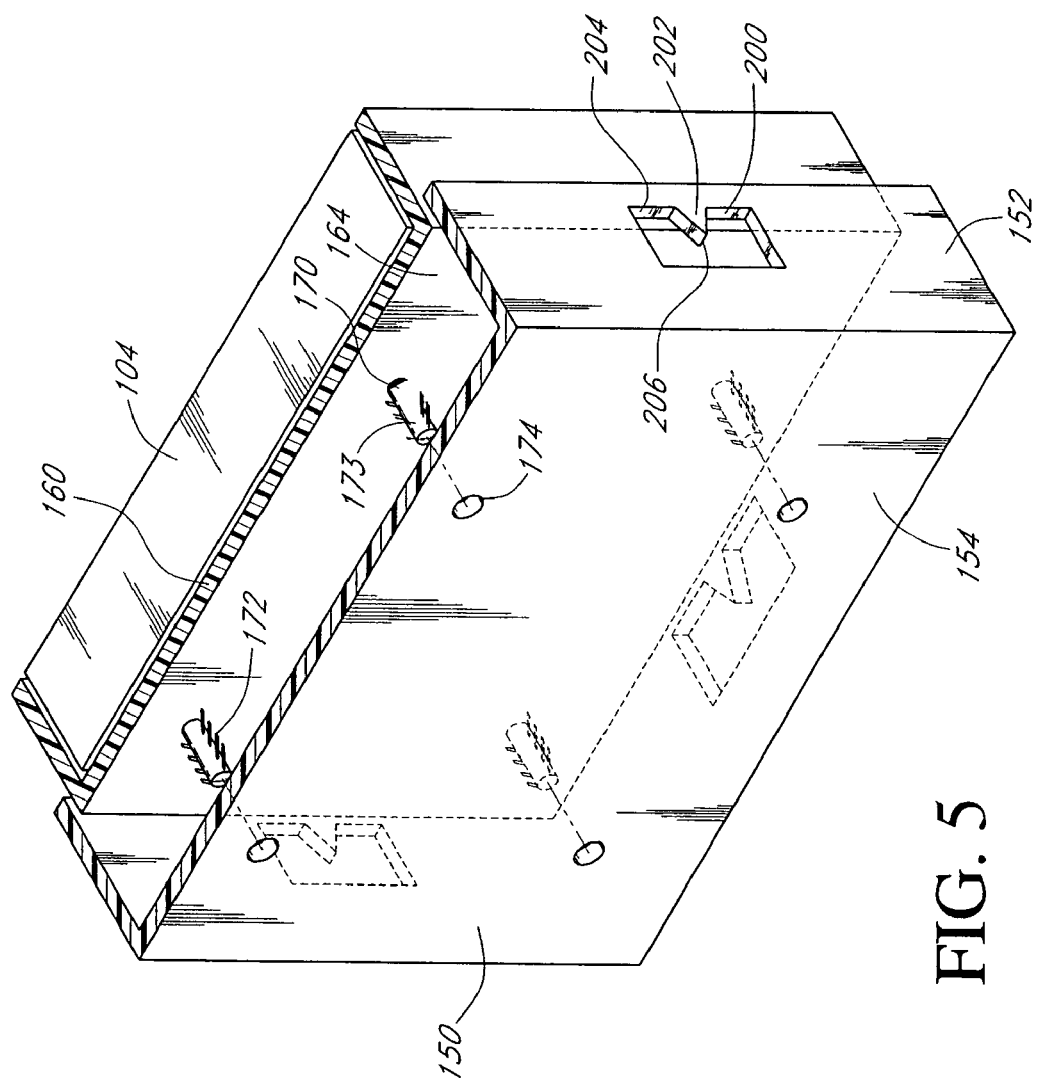
FIG. 5 illustrates an perspective view of the integrated video screen being mounted to the headrest via the carrier member and the plurality of fasteners of FIG. 4.

FIG. 4 illustrates a cross-sectional view of the integrated video screen 104 being mounted to the headrest 100 via a carrier receptacle 150, a carrier member 160, and first fasteners 170. FIG. 5 illustrates a perspective view of the integrated video screen 104 being mounted to the headrest 100 via the carrier receptacle 150, the carrier member 152, and the first fasteners 170. In one embodiment, the carrier receptacle 150 comprises a plurality of planar sidewalls 152 and a rear planar wall 154 that are joined together in a manner so as to form a substantially rectangular outer structure 156 having an inner recessed region 158 that is adapted to receive the carrier member 152 therein. Similarly, the carrier member 152 comprises a plurality of planar sidewalls 162 and a rear planar wall 164 that are joined together in a manner so as to form a substantially rectangular outer structure 166 having an inner recessed region 168 that is adapted to receive the video screen 104 therein.

As illustrated in FIG. 4, the video screen 104 may be mounted within the carrier member 160 via side fasteners 180 (shown in FIGS. 6A, 6B) and then the carrier member 152 is mounted within the carrier receptacle 150 via the first fasteners 170 so as to simplify the mounting of the video screen 104 to the headrest 100 including the headrest bun 106. In one aspect, the first fasteners 170 may comprise a plurality of flexible engagement members 172 that extend therefrom so as to mechanically couple with a plurality of mounting apertures 174 (FIG. 5) formed in the rear wall 154 of the carrier receptacle 150. The first fasteners 170 may further comprise a central member 173 that extends outward from the rear wall 164 of the carrier member 160. Also, the flexible engagement members 172 are attached to the central member 173, wherein the flexible engagement members 172 are deformable so as to allow insertion of the central member 173 into the mounting apertures 174 in the rear wall 164 of the carrier receptacle 150. Moreover, the flexible engagement members 170 are biased outward so as to inhibit removal of the central member 173 from the mounting apertures 174 in the rear wall 154 of the carrier receptacle 150. In addition, the first fasteners 170 comprise a head 176 that abuts the rear wall 164 of the carrier member 152 and is positioned through a plurality of second apertures 178 formed in the rear wall 164 of the carrier member 152.

Advantageously, the video screen 104 can be mounted to the headrest 100 via the carrier receptacle 150 and the carrier member 152 without using external fasteners that may be seen. Hence, the video screen 104 can be mounted to the headrest 100 in a more aesthetically appealing manner, wherein the front surface 120 of the video screen 104 recessed or flush mounted with respect to the outer surface 134 of the headrest 100, and wherein the first and second fasteners 170, 180 are concealed from view.

As illustrated in FIG. 5, the sidewalls 152 of the carrier receptacle 150 each comprise at least one sidewall aperture 200 having at least one serrated tooth 202 protruding from an interior sidewall 204. In one embodiment, the at least one serrated tooth 202 is triangular in shape having a pointed tip 206 that projects outward from the interior sidewall 204 in a horizontal manner. It should be appreciated that the serrated tooth 202 may comprise any one of a number of various shapes known in the art without departing from the scope of the present teachings. Additionally, as will be shown in FIG. 8, the pointed tip 234 engages with the outer skin 230 (FIG. 8) and inhibits removal of the outer skin 230 from the at least one sidewall aperture 200 formed in the carrier receptacle 150. Advantageously, as will be described in greater detail herein below, the serrated tooth 200 allows outer skin from the motor vehicle seat 102, 112 to be attached to the carrier receptacle 150 by wrapping the outer skin around the planar sidewalls 152 and into the recessed region 158 of the carrier receptacle 150 and then securing the outer skin to the serrated tooth 200.

FIG. 6A illustrates a perspective view of attaching the integrated video screen 104 to the carrier member 152 via the second fasteners 180. In one embodiment, the planar sidewalls 162 of the carrier member 160 comprise pivot apertures 184 that allow the video display 104 to be mounted to the carrier member 160. Also, the pivot apertures 184 are adapted to rotatably receive the second fasteners 180. As illustrated in FIG. 6A, the second fasteners 180 comprise a threaded region 186 that mechanically couples to threaded apertures 196 (FIG. 7) formed in the video screen 104 in a generally known manner so as to be securely attached thereto. Moreover, the second fasteners 180 further comprise a head 182 and a smooth pivot region 188 interposed between the threaded region and the head 182.

In one aspect, the pivot region 188 of the second fastener 180 rotatably communicates with the pivot aperture 184 of the carrier member 160 to thereby allow the video screen 104 to pivot or tilt with respect to the carrier member 160 and/or the headrest 100 along a horizontal pivot axis 190 defined by the horizontally mounted second fasteners 180. Hence, the video screen 104 is pivotally attached to the carrier member 160 such that the plane of the video screen 104 can be adjusted with respect to the headrest 100 by a user about the defined horizontal pivot axis 190. Advantageously, the horizontal pivot axis 190 allows the video screen 104 to readily pivot when mounted to the headrest 100 to thereby allow greater positional flexibility during viewing of the video screen 104 by a user.

FIG. 6B further illustrates a perspective view of attaching the integrated video screen 104 to the carrier member 152 via the second fasteners 180. In one embodiment, as illustrated in FIG. 6B, the second fasteners 180 can be mounted vertically through the planar sidewalls 162 of the carrier member 160. The pivot region 188 of the vertically mounted second fasteners 180 rotatably communicates with the pivot aperture 184 of the carrier member 160 to thereby allow the video screen 104 to pivot or tilt side-to-side with respect to the carrier member 160 and/or the headrest 100 along a vertical pivot axis 191 defined by the vertically mounted second fasteners 180. Hence, the video screen 104 is pivotally attached to the carrier member 160 such that the plane of the video screen 104 can be adjusted with respect to the headrest 100 by a user about the vertical pivot axis 191. Advantageously, the vertical pivot axis 191 allows the video screen 104 to readily pivot when mounted to the headrest 100 to thereby allow greater positional flexibility during viewing of the video screen 104 by a user.

In one aspect, it should be appreciated that the second fasteners 180 may comprise generally known screws, such as sheet metal screws, without departing from the scope of the present invention. It should also be appreciated that the pivot region 188 of the second fasteners 180 may be threaded in a manner such that the video screen 104 can still pivot with respect to the carrier member 150 without departing from the scope of the present invention.

Figure 6C:
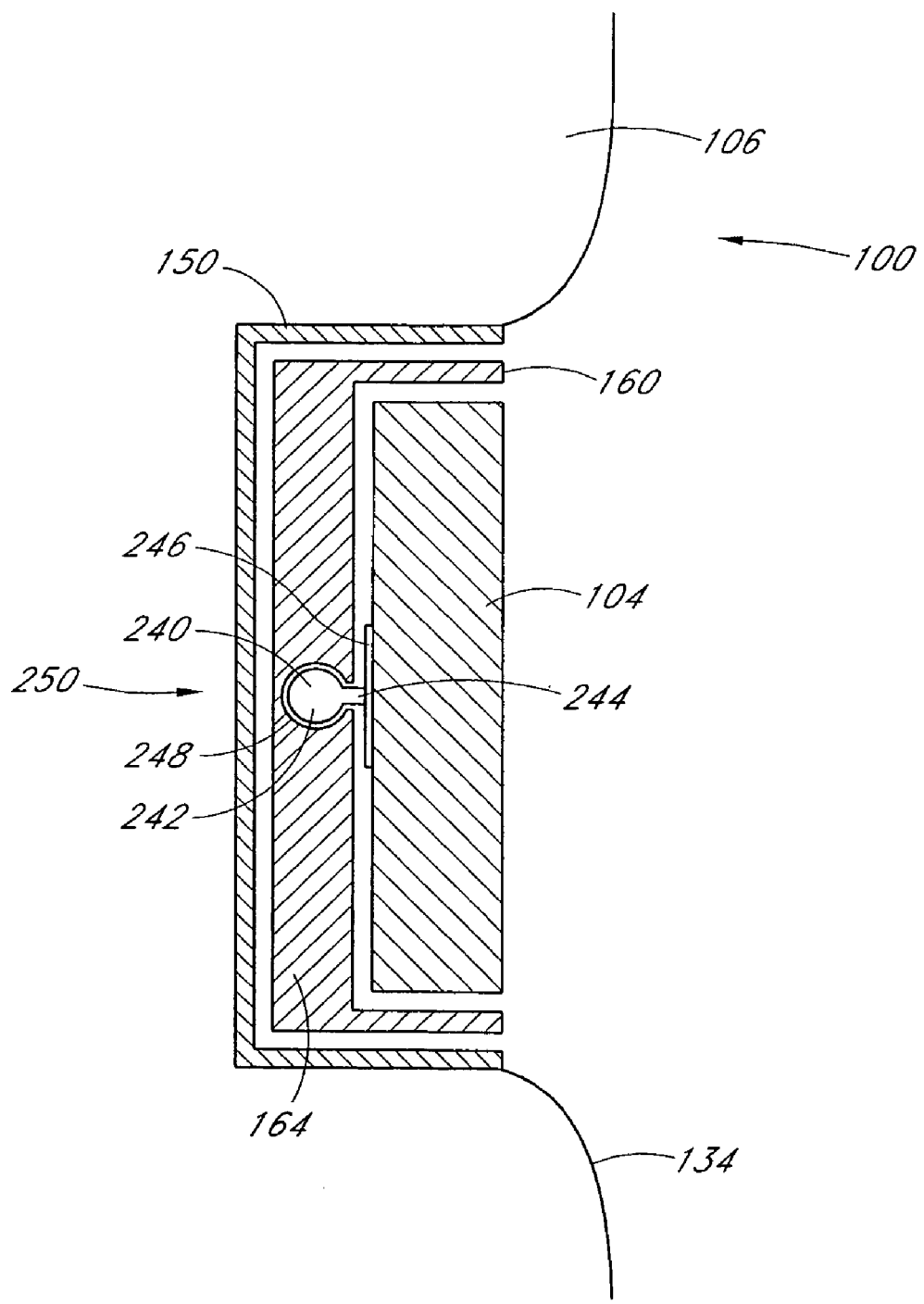
FIG. 6C illustrates a side view of mounting the integrated video screen to the carrier member via pivot member.

FIG. 6C illustrates a view of attaching the integrated video screen 104 to the carrier member 152 via a pivot member 240. In one embodiment, as illustrated in FIG. 6C, the pivot member 240 comprises a spherical ball 242 attached to the video screen 104 via a shaft 244 and a plate 246. The spherical ball 242 is positioned within a spherical receptacle 248 formed in the rear wall 164 of the carrier member 160. As illustrated in FIG. 6C, the rear wall 164 of the carrier member 160 may be dimensioned so as to accommodate the spherical receptacle 248. In one aspect, the plate 246 of the pivot member 240 may be attached to the video screen 104 using an adhesive, such as epoxy or glue, or fasteners, such as screws or bolts. In addition, the shaft 244 distally extends from the plate 246 towards the spherical receptacle 248 of the carrier member 160. Also, the shaft 244 and the spherical ball 242 may be formed as an integral part of the plate 246 or may be formed separately and interconnected to the plate 246 via an adhesive or fasteners.

Moreover, once the pivot member 240 is attached to the video screen 104 in a manner as previously described, the spherical ball 242 of the pivot member 240 can be pressed to fit within the spherical receptacle 248 formed in the rear wall 164 of the carrier member 160. In one aspect, the spherical ball 242 may be sized at least less than the size of the spherical receptacle 248 so as to allow rotational movement therein. Advantageously, the resulting interconnection between the spherical ball 242 of the pivot member 240 and the spherical receptacle 248 of the carrier member 160 defines a pivot point 250 to thereby allow the video screen 104 to pivot, tilt, or rotate in a multi-directional manner with respect to the defined pivot point 250. Therefore, the defined pivot point 250 allows the video screen 104 to readily pivot when mounted to the headrest 100 to thereby allow greater positional flexibility during viewing of the video screen 104 by a user.

Figure 7:
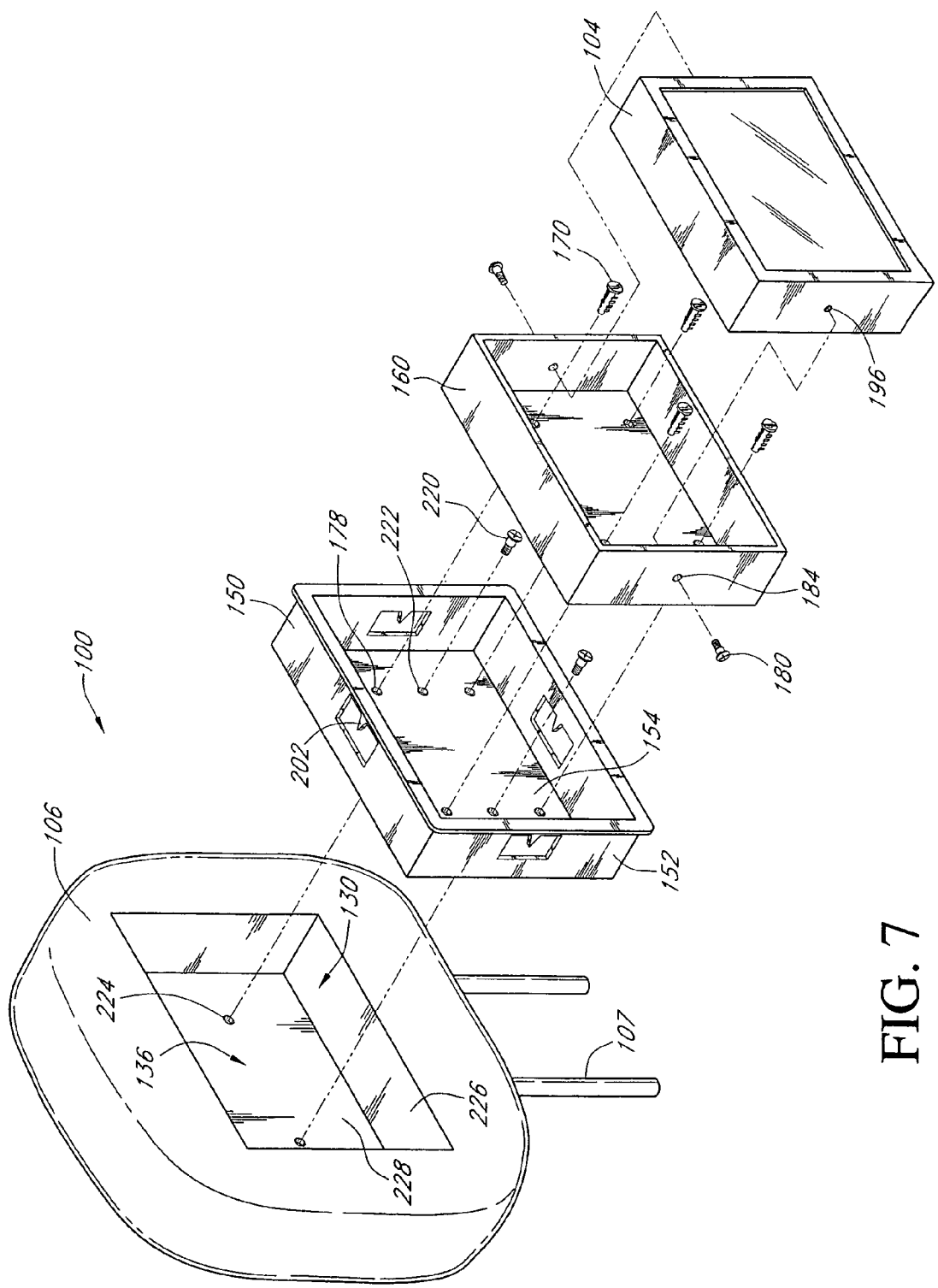
FIG. 7 illustrates a perspective view of mounting the integrated video screen to the adjustable headrest of FIG. 1A.

FIG. 7 illustrates a perspective view of mounting the integrated video screen 104 to the headrest 100 of FIG. 1A. In one embodiment, as illustrated in FIG. 7, the opening 130 is formed in the headrest bun 106 so as to define the substantially rectangular interior region 136 and to receive the carrier receptacle 150. The carrier receptacle 150 can then be positioned within the opening 130 so that the planar sidewalls 152 and the planar rear wall 154 abut the interior walls 226 of the mounting recess 136 formed in the headrest bun 106. In one embodiment, the carrier receptacle 150 can be secured to the headrest 100 via one or more third fasteners 220, such as screws, machine screws, sheet metal screws, etc. As illustrated in FIG. 7, the third fasteners 220 are positioned through rear wall apertures 222 formed in the rear wall 154 of the carrier receptacle 150 and coupled to rear mounting apertures 224 formed in a back wall 226 of the mounting recess 136 of the headrest bun 106. Advantageously, the third fasteners 220 can be securely attached to a structural component (not shown) of the headrest 100, such as an internal framework member of the headrest 100, so as to form a rigid attachment between the carrier receptacle 150 and the headrest 100.

In addition, the video screen 104 may be mounted to the carrier member 160 so as to pivot with respect thereto in a manner as previously described with reference to FIGS. 6A, 6B, 6C. Following, the carrier member 160 including the video screen 104 can then be mounted to the carrier receptacle 150 via the first fasteners 170 in a manner as previously described with reference to FIG. 4. Advantageously, this method of attaching the video screen 104 to the headrest 100 via the carrier receptacle 150, the carrier member 160, and the fasteners 170, 180 allows the video screen 104 to be securely mounted to the headrest 100 while providing a means for pivoting the video screen 104 with respect to the headrest 100 so as to improve the viewing range by a user.

Figure 8:
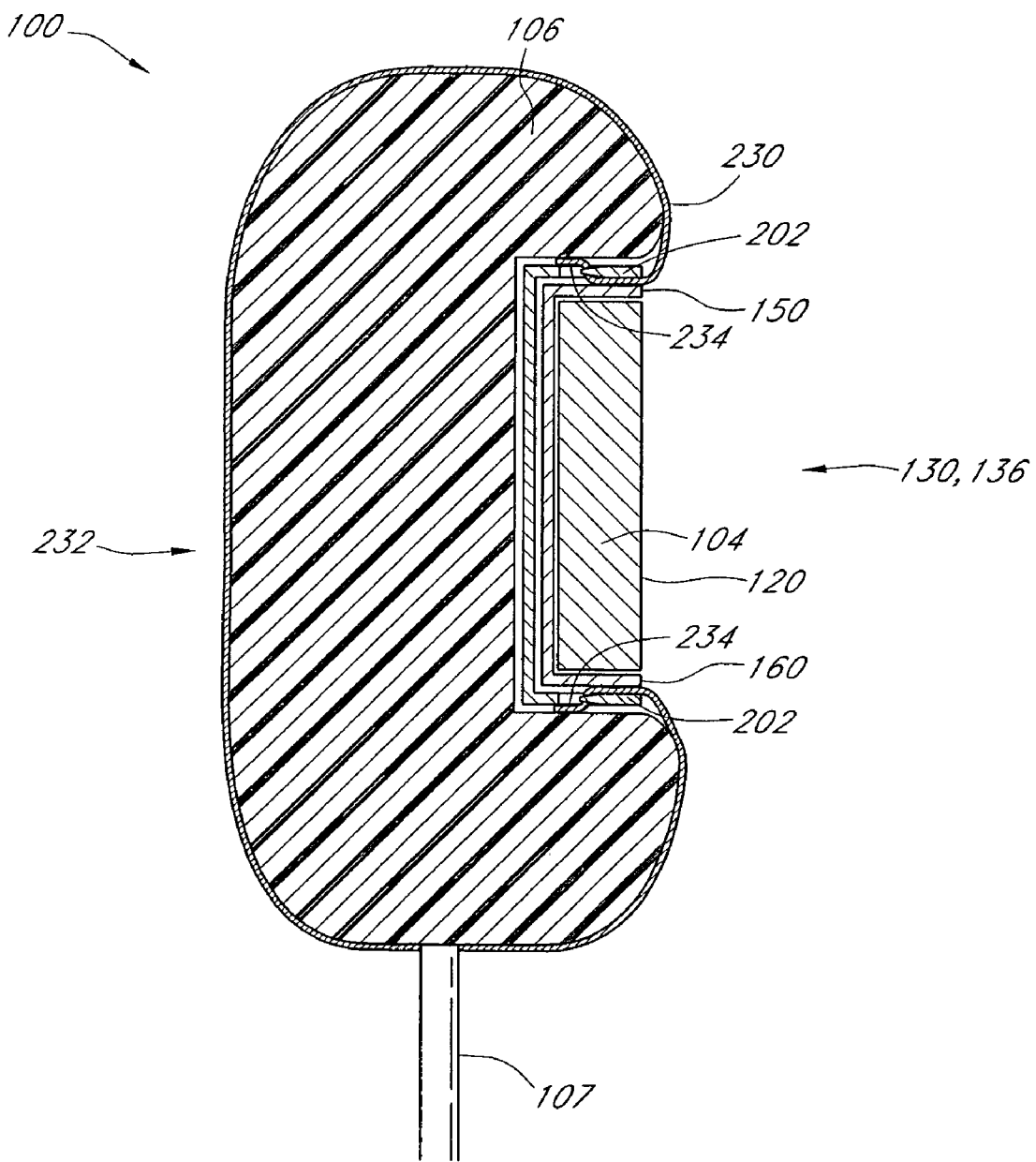
FIG. 8 illustrates a cross-sectional view of the video screen mounted to the headrest, wherein an outer skin from the headrest is secured to the carrier receptacle.

FIG. 8 illustrates a cross-sectional view of the video screen 104 mounted to the headrest 100, wherein the outer skin 230 of the headrest 100 of the motor vehicle seat 102 is attached to the carrier receptacle 150 and the carrier member 160 with the video screen 104 mounted therein is mounted within the mounting recess 136 of the carrier receptacle 150. As is generally known, many motor vehicle car seats comprise the illustrated outer skin 230, such as fabric, leather, upholstery, vinyl, etc., that provides a outer surface 232 for a user to lean against or rest upon. In one aspect, when mounting the integrated video screen 104 into the headrest 100 of the motor vehicle seat 102, the outer skin 230 is adapted to accommodate the video screen 104 including the carrier receptacle 150. In some situations, one or more flaps 234 can be formed in the outer skin 230 and attached to the one or more serrated teeth 202 formed in the planar sidewalls 152 of the carrier receptacle 150.

As further illustrated in FIG. 8, the carrier receptacle 150 may be positioned within the mounting recess 136 formed in the headrest bun 106, and then the outer skin 230 is secured to the serrated teeth 202 via the flaps 234 formed therein by hooking the flaps 234 to one or more of the serrated teeth 202. Once the outer skin 230 is attached to the serrated teeth 202 via the flaps 234, the carrier member 160 is firmly pressed within the mounting recess 136 of the headrest bun 106 so that the first fasteners 170 couple to the mounting apertures 174 formed in the rear wall 154 of the carrier receptacle 150.

Advantageously, this interconnection between the carrier member 160 and carrier receptacle 150 provides a quick and easy means for mounting of the video screen 104 to the headrest 100. In addition, the pressed fit of the outer skin between the carrier member 160 and the carrier receptacle 150 further secures the outer skin of the motor vehicle seat 102 to the carrier receptacle 150. As a result, the outer skin is securely held to the carrier receptacle 150 via the one or more serrated teeth 202 formed in the planar sidewalls 152 of the carrier receptacle 150 and the pressed fit of the carrier member 160 within the mourning recess 136 of the carrier receptacle 150.

Although the foregoing description has shown, described and pointed out the fundamental novel features of the invention, it will be understood that various omissions, substitutions, and changes in the form of the detail of the apparatus as illustrated, as well as the uses thereof, may be made by those skilled in the art, without departing from the spirit or scope of the present invention. Consequently, the scope of the invention should not be limited to the foregoing discussion, but should be defined by the appended claims.

What is claimed is:

1. A headrest assembly for a vehicle seat, the assembly comprising:
    a receptacle member having a plurality of sidewalls and a back wall so as to define an opening wherein the receptacle member is adapted to be positioned in a back of the vehicle seat wherein the opening is facing away from the back of the vehicle seat when the receptacle member is positioned within the back of the vehicle seat and wherein the back wall of the receptacle member defines at least one securing aperture;
    a carrier member having a plurality of sidewalls and a back wall so as to define an opening, wherein the opening in the carrier member is facing away from the back of the vehicle seat when the carrier member is positioned within the receptacle member and wherein the back wall of the carrier member defines at least one securing aperture;
    an outer skin having edges that extend into the opening of the receptacle member and attached to at least some of the plurality of sidewalls of the receptacle member and wherein the edges of the outer skin are substantially concealed when the carrier member is positioned within the opening of the receptacle member;
    at least one fastener that extends through the at least one securing aperture of the carrier member and engages with the at least one securing aperture of the receptacle member to allow securing of the carrier member in the opening of the receptacle member;
    a video display unit that is sized so as to be positioned within the opening in the carrier member and substantially conceal the at least one fastener when in a viewing orientation.

2. The assembly of claim 1, wherein the at least one fastener comprises a plurality of fasteners that include a central member dimensioned to extend through the securing aperture of the carrier member and a plurality of flexible engagement members attached to the central member, wherein the flexible engagement members are deformable so as to allow insertion of the central member into the corresponding securing aperture of the receptacle member, and wherein the flexible engagement members are biased outward so as to inhibit removal of the central member from the apertures of the receptacle member.

3. The assembly of claim 1, wherein the video display unit defines a plane and is pivotally attached to the carrier member such that the plane of the video display unit can be adjusted by a user about a pivot axis.

4. The assembly of claim 3, wherein the video display unit is pivotable about a substantially horizontal axis.

5. The assembly of claim 3, wherein first and second pivot member coupled to the video display unit are positioned through the carrier member so as to define the pivot axis and pivotably secure the video display unit to the carrier member.

6. The assembly of claim 1, wherein the receptacle member includes an outer lip and a plurality of outer skin capture members that engage with the outer skin such that the outer skin is extended over the outer lip of the receptacle member and secured to the outer skin capture members.

7. The assembly of claim 6, wherein the plurality of capture members define a pointed surface that engages with the outer skin and inhibits removal of the outer skin from the opening defined by the receptacle member.

8. The assembly of claim 1, further comprising a screen cover that is dimensioned to cover the video display unit, and wherein the cover is selectively disengagable so as to allow visual access to the video display unit.

9. The assembly of claim 8, wherein the cover includes an impact attenuating material.

10. The assembly of claim 8, wherein the cover includes a generally rigid layer to provide physical protection of the video display unit.

11. The assembly of claim 1, wherein the receptacle member has four sidewalls.

12. The assembly of claim 1, wherein the carrier member has four sidewalls.

13. The assembly of claim 1, wherein the edges of the outer skin are secured to each of the plurality of sidewalls.

14. A headrest assembly for a vehicle seat, the assembly comprising:
    a receptacle member having a plurality of sidewalls that are joined to a back wall so as to define an opening wherein the receptacle member is adapted to be positioned in a back of the vehicle seat wherein the opening is facing away from the back of the vehicle seat when the receptacle member is positioned within the back of the vehicle seat and wherein the back wall of the receptacle member defines at least one securing aperture;
    a carrier member having a plurality of sidewalls and a back wall so as to define an opening, wherein the opening in the carrier member is facing away from the back of the vehicle seat when the carrier member is positioned within the receptacle member and wherein the back wall of the carrier member defines at least one securing aperture;
    an outer skin having edges that extend into the opening of the receptacle member and secured to at least some of the plurality of sidewalls of the receptacle member, and wherein the edges of the outer skin are substantially concealed when the carrier member is positioned within the opening of the receptacle member;
    at least one fastener that extends through the at least one securing aperture of the carrier member and engages with the at least one securing aperture of the receptacle member to allow securing of the carrier member in the opening of the receptacle member;
    a video display unit that is sized so as to be positioned within the opening in the carrier member and substantially conceal the at least one fastener when in a viewing orientation.

* * * * *